(12) United States Patent
Jones et al.

(10) Patent No.: US 8,438,173 B2
(45) Date of Patent: May 7, 2013

(54) INDEXING AND QUERYING DATA STORES USING CONCATENATED TERMS

(75) Inventors: Willard Bruce Jones, Redmond, WA (US); Simon Skaria, Sammamish, WA (US); Naresh Kannan, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 340 days.

(21) Appl. No.: 12/350,977

(22) Filed: Jan. 9, 2009

(65) Prior Publication Data

US 2010/0185629 A1 Jul. 22, 2010

(51) Int. Cl.
G06F 17/30 (2006.01)

(52) U.S. Cl.
USPC .......................................... 707/753; 707/758

(58) Field of Classification Search .................. 707/711, 707/715, 739, 740, 741, 736, 747, 748, 752, 707/753, 758, 769, 773, 774, 775
See application file for complete search history.

(56) References Cited

U.S. PATENT DOCUMENTS

| | | | | |
|---|---|---|---|---|
| 5,487,164 | A | * | 1/1996 | Kirchhofer et al. .................... 1/1 |
| 5,579,515 | A | * | 11/1996 | Hintz et al. ................... 707/752 |
| 6,983,275 | B2 | | 1/2006 | Koo et al. |
| 6,999,972 | B2 | * | 2/2006 | Lusen et al. ................. 707/756 |
| 7,120,623 | B2 | | 10/2006 | Ganesan et al. |
| 7,191,170 | B2 | | 3/2007 | Ganguly et al. |
| 7,213,011 | B1 | | 5/2007 | Das |
| RE41,901 | E | * | 10/2010 | Furusho ........................ 707/752 |
| 2002/0083033 | A1 | * | 6/2002 | Abdo et al. ....................... 707/1 |
| 2006/0212429 | A1 | | 9/2006 | Bruno et al. |
| 2006/0218123 | A1 | | 9/2006 | Chowdhuri et al. |
| 2008/0114733 | A1 | | 5/2008 | Friesenhahn et al. |
| 2008/0215544 | A1 | | 9/2008 | Galindo-Legaria et al. |
| 2008/0288442 | A1 | * | 11/2008 | Feigenbaum et al. ............ 707/2 |
| 2009/0177622 | A1 | * | 7/2009 | Hu et al. ........................... 707/2 |

OTHER PUBLICATIONS

Leser, et al., "GRIPP—Indexing and Querying Graphs based on Pre- and Postroder Numbering", retrieved at <<http://141.20.20.55/~trissl/2006/tech_report_no207.pdf>> pp. 55.

Leubner, et al., "Personalized Keyword Search with Partial-Order Preferences", retrieved at <<http://www.informatik.uni-augsburg.de/lehrstuehle/dbis/db/publications/all_db_publications/2002_leu_kie_sbbd02/2002_leu_kie_sbbd02.pdf>> pp. 13.

(Continued)

*Primary Examiner* — Greta Robinson
(74) *Attorney, Agent, or Firm* — Hope Baldauff Hartman, LLC

(57) ABSTRACT

Tools and techniques for indexing and querying data stores using concatenated terms are provided. These tools may receive input queries that include at least two query terms. The query terms are correlated respectively with fields contained within records within a data store, with these fields being populated with respective field values. The query terms are arranged according to an indexing priority according to which the fields are ranked within an indexing table, which is associated with the data store. The tools then concatenate the query terms as arranged according to the indexing priority. In turn, the tools search the index table for any entries that are responsive to the concatenated query terms.

11 Claims, 6 Drawing Sheets

OTHER PUBLICATIONS

Gassner, et al., "Query Optimization in the IBM DB2 Family", retrieved at <<http://www.cse.iitb.ac.in/dbms/Data/Papers-Other/Scheduling/RJ9734_DB2_optimization_93.ps.gz>> Mar. 17, 1994, pp. 1-14.

Leubner et al., "Personalized Keyword Search with Partial-Order Preferences", 2002, Proceedings of Brazilian Symposium on Databases (SBBD '02), pp. 181-193.

Trissl et al., "GRIPP—Indexing and Querying Graphs based on Pre- and Postorder Numbering", 2006, Technical Report No. 207, Humboldt-Universität zu Berlin, downloaded from http://141.20.20.55/-trissl/2006/tech_report_no207.pdf, 55 pages.

Gassner et al., "Query Optimization in the IBM DB2 Family," Mar. 17, 1994, downloaded from http://www.cse.iitb.ac.in/dbms/Data/Papers-Other/Scheduling/RJ9734_DB2_optimization_93.ps.gz, 14 pages.

* cited by examiner

INDEXING AND QUERYING DATA STORES USING CONCATENATED TERMS

BACKGROUND

Data stores may use indexes to make query-time processing more efficient. However, choosing an appropriate indexing strategy remains an ongoing challenge, particularly for large data stores that may be deployed in enterprise or corporate settings.

SUMMARY

Tools and techniques for indexing and querying data stores using concatenated terms are provided. These tools may receive input queries that include at least two query terms. The query terms are correlated respectively with fields contained within records within a data store, with these fields being populated with respective field values. The query terms are arranged according to an indexing priority according to which the fields are ranked within an indexing table, which is associated with the data store. The tools then concatenate the query terms as arranged according to the indexing priority. In turn, the tools search the index table for any entries that are responsive to the concatenated query terms It should be appreciated that the above-described subject matter may be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
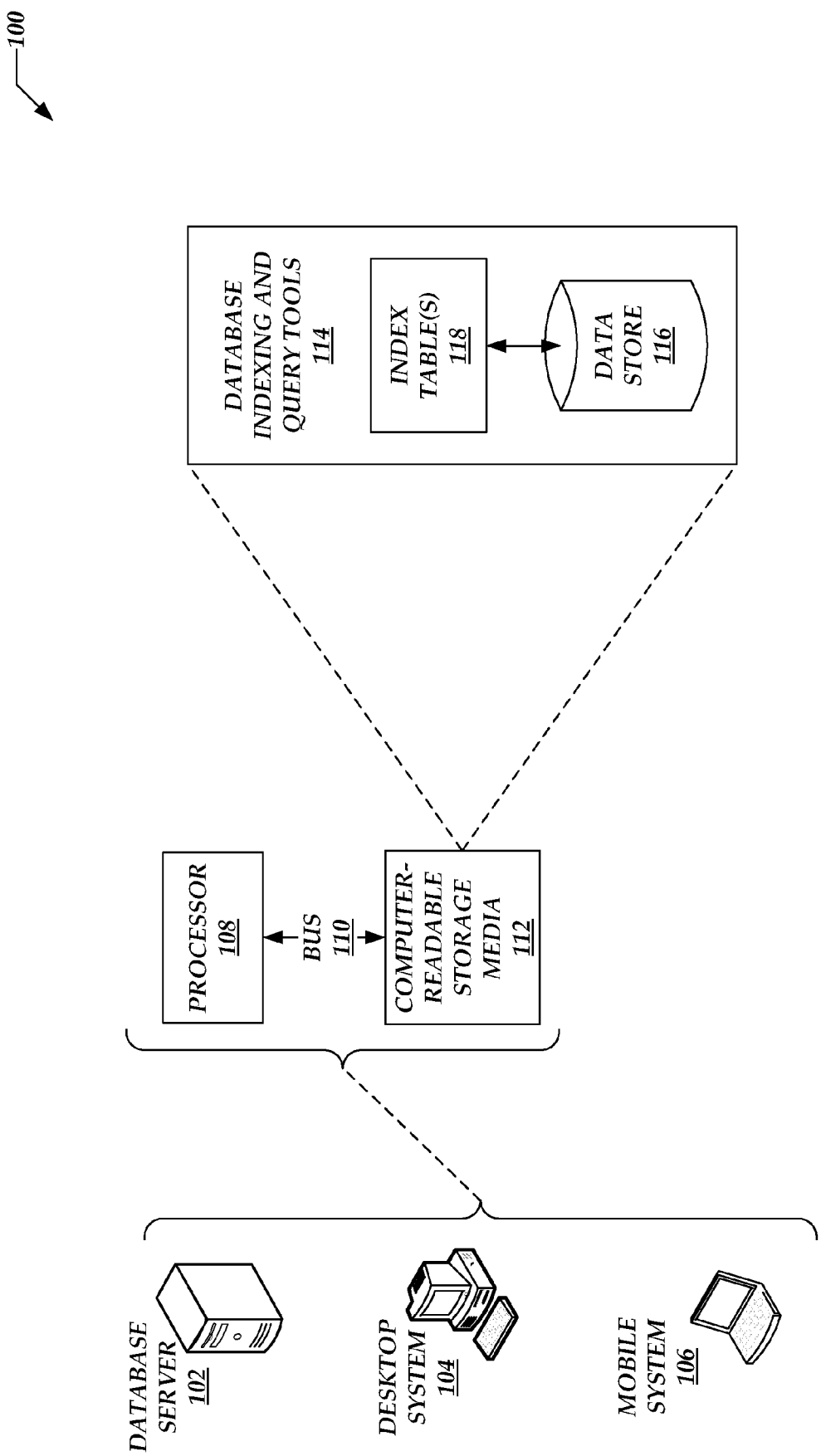
FIG. 1 is a combined block and flow diagram illustrating systems or operating environments suitable for implementing tools and techniques related to indexing and querying data stores using concatenated terms.

The following detailed description provides tools and techniques for indexing and querying data stores using concatenated terms. While the subject matter described herein presents a general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

The following detailed description refers to the accompanying drawings that form a part hereof, and that show, by way of illustration, specific example implementations. Referring now to the drawings, in which like numerals represent like elements through the several figures, this description provides various tools and techniques for indexing and querying data stores using concatenated terms.

FIG. 1 illustrates systems or operating environments, denoted generally at 100, suitable for indexing and querying data stores using concatenated terms. Turning to FIG. 1 in more detail, tools and techniques for indexing and querying data stores using concatenated terms may be implemented in connection with any number of different hardware environments. For example, the operating environments 100 may include one or more instances of database servers 102, which may house and maintain data stores on behalf of any number of client systems.

The operating environments 100 may include one or more instances of desktop systems 104. In some implementations, the desktop systems 104 may represent client systems that interact with the database servers 102 in connection with querying data stores maintained by those database servers 102. In other implementations, the desktop systems 104 may represent standalone systems that house and maintain databases or data stores for query by local users interacting directly with the desktop system 104.

The operating environments may also include one or more instances of mobile computing systems 106. In general, the description above relating to the desktop systems 104 may apply equally to the mobile systems 106. However, the mobile systems 106 are relatively portable as compared to the desktop systems 104, which are relatively stationary.

The graphical representations of the database servers 102, the desktop systems 104, and the mobile systems 106 as presented in FIG. 1 are chosen only for convenience of illustration, but not to limit possible implementations. For example, suitable hardware environments may also include, but are not limited to: relatively stationary desktop computing systems; laptop notebook, or other relatively mobile computing systems; wireless communications devices, such as cellular phones, smartphones, wireless-enabled personal digital assistants (PDAs), or other similar communications devices. In addition, the tools and techniques described herein for indexing and querying data stores using concatenated terms may be implemented with hardware environments other than those shown in FIG. 1, without departing from the scope and spirit of the present description.

Turning to the database servers 102, desktop systems 104, and mobile systems 106 (collectively, hardware environments 102-106) in more detail, these systems may include one or more processors 108, which may have a particular type or architecture, chosen as appropriate for particular implementations. The processors 108 may couple to one or more bus systems 110, having type and/or architecture that is chosen for compatibility with the processors 108.

The hardware environments 102-106 may also include one or more instances of computer-readable storage medium or media 112, which couple to the bus systems 110. The bus systems 110 may enable the processors 108 to read code and/or data to/from the computer-readable storage media 112. The media 112 may represent apparatus in the form of storage elements that are implemented using any suitable technology, including but not limited to semiconductors, magnetic materials, optics, or the like. The media 112 may include memory components, whether classified as RAM, ROM, flash, or other types, and may also represent hard disk drives.

The storage media 112 may include one or more modules of instructions that, when loaded into the processor 108 and executed, cause the hardware environments 102-106 to perform various techniques related to indexing and querying data stores using concatenated terms. As detailed throughout this description, these modules of instructions may also provide various tools or techniques by which the hardware environments 102-106 may provide for indexing and querying data stores using the components, flows, and data structures discussed in more detail throughout this description. For example, the storage media 112 may include one or more software modules that implement database indexing and query tools 114.

Turning to the database indexing and query tools 114 in more detail, in overview, these tools 114 may include any number of data stores 116, with FIG. 1 illustrating one data store 116 only for clarity of illustration. These data stores 116 may be organized in any convenient fashion, according to the circumstances of a particular implementation. For example, the data stores 116 may represent, but are not limited to, relational databases, object-oriented databases, or the like. For additional description of the data stores 116, the discussion now turns to a description of FIG. 2, before returning to complete the description of FIG. 1.

Figure 2:
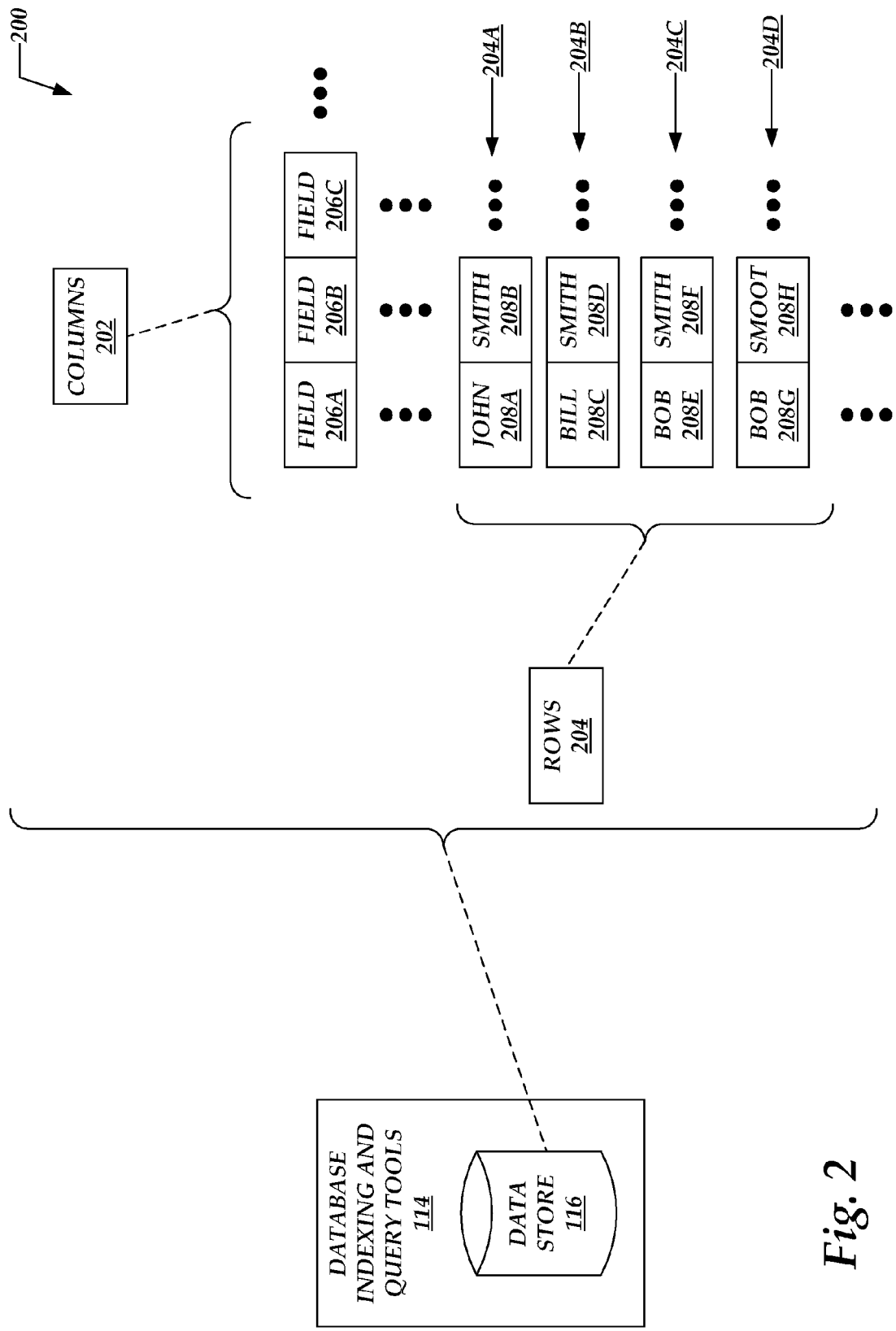
FIG. 2 is a block diagram providing further details relating to illustrative database formats and layouts, in connection with indexing and querying data stores using concatenated terms.

FIG. 2 provides illustrative database formats and layouts, denoted generally at 200, suitable for implementing the data stores 116 in connection with indexing and querying these data stores. For ease of description and reference, but not to limit possible implementations, FIG. 2 carries forward representative database indexing and query tools 114, as well as a representative data store 116.

Turning to the data stores 116 in more detail, these data stores may be organized in row-column format, with a set of columns represented generally at 202 and a set of rows represented generally at 204. It is noted that this description and drawings illustrate and discuss this row-column organizational format only for the purposes of providing the present description. However, implementations of this description may deviate from this row-column organization without also departing from the scope and spirit of the present description.

In general, the data stores 116 may include any number of columns 202, as well as any number of rows 204. Accordingly, the arrangement shown in FIG. 2 is understood as illustrative, rather than limiting. Individual rows 204 may correspond to individual records represented within the data store 116. In addition, individual columns 202 may correspond to particular fields or properties associated with these individual records. In the example shown in FIG. 2, the columns 202 may include individual fields 206a, 206b, and 206c (collectively, fields 206). For different particular rows 204, these fields 206 may be populated with appropriate values.

This description discusses examples in which the fields 206a store given names or first names associated with different persons, and in which the fields 206b store last names or surnames associated with these persons. For example, a row 204a corresponds to a record representing a person with the first name "John" and the second name "Smith". The first name "John" populates a storage element 208a, and the second name "Smith" populates a storage element 208b.

A row 204b corresponds to a record representing a person with the first name "Bill" and the second name "Smith". The first name "Bill" populates a storage element 208c, and the second name "Smith" populates a storage element 208d.

A row 204c corresponds to a record representing a person with the first name "Bob" and the second name "Smith". The first name "Bob" populates a storage element 208e, and the second name "Smith" populates a storage element 208f.

A row 204d corresponds to a record representing a person with the first name "Bob" and the second name "Smoot". The first name "Bob" populates a storage element 208g, and the second name "Smoot" populates a storage element 208h.

In these examples, the rows 204 in the data store 116 may or may not be ordered or sorted. Thus, the various rows 204a-204d may be arranged in any arbitrary order.

Returning now to FIG. 1, the database indexing query tools 114 may also include any number of index tables 118. The index tables 118 are detailed further in description below with FIG. 3. In overview, the index tables 118 may facilitate more efficient searching of the data stores 116.

Figure 3:
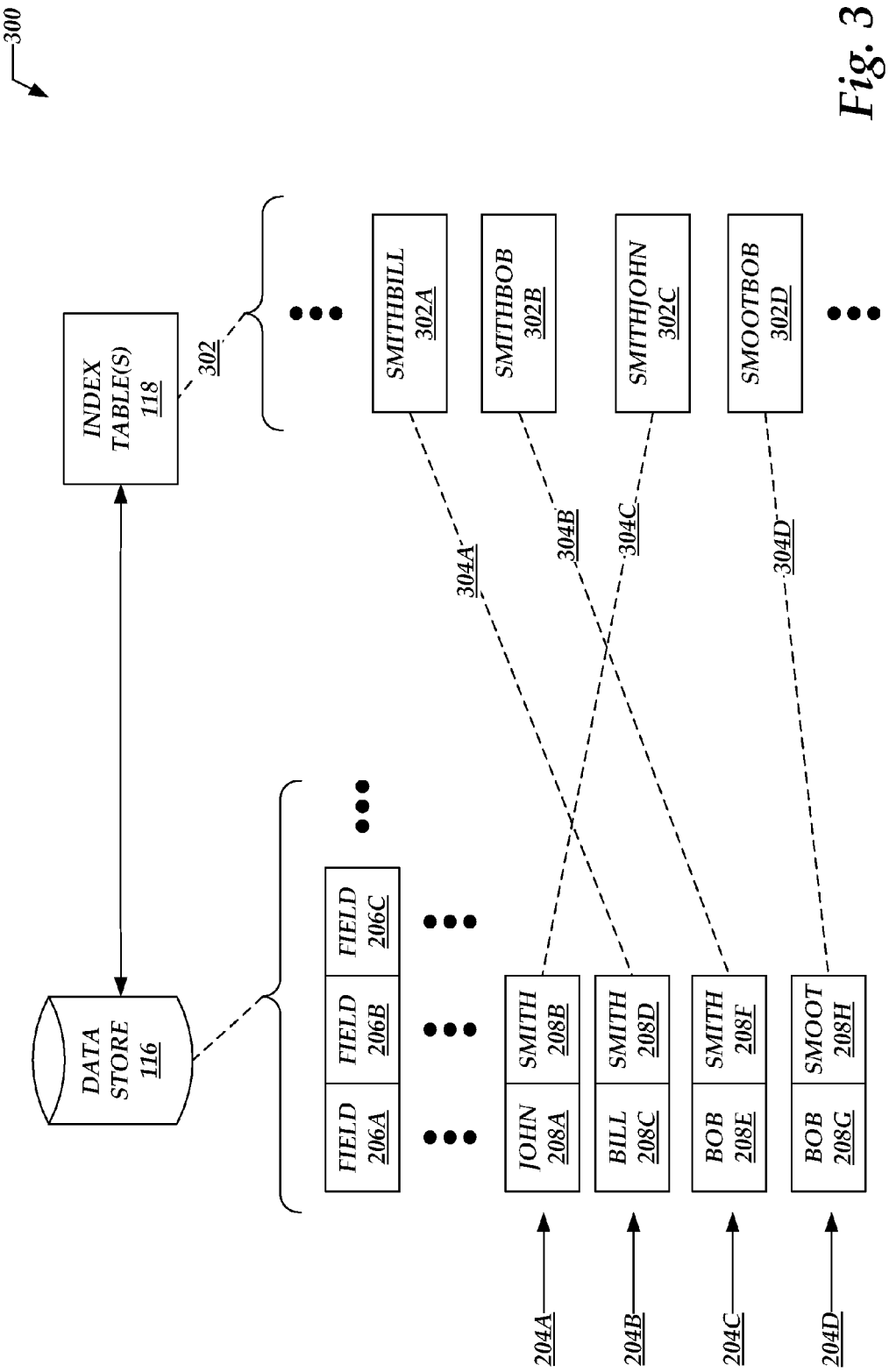
FIG. 3 is a block diagram illustrating example index tables, suitable for searching the data stores illustrated in FIG. 2.

FIG. 3 illustrates additional details, denoted generally at 300, of the index tables 118, suitable for searching the data stores 116 carried forward from FIG. 2. In addition, FIG. 3 carries forward from FIG. 2 the example fields 206a-206c that correspond to at least some of the columns within the data store 116. FIG. 3 also carries forward the representative storage elements 208a-208h (collectively, storage elements 208), populated with the example first and last names as discussed above with FIG. 2.

Turning to the index tables 118 in more detail, the index tables 118 may include any number of entries 302 that are respectively associated with rows within the data store 116. More specifically, the entries 302 may be populated with concatenated versions of two or more of the terms or values used to populate rows within the data store 116. As described in further detail below, the entries 302 may be sorted or otherwise organized, to enable efficient location of particular ones of the entries 302. in the example shown in FIG. 3, the entries 302 may include an entry 302a corresponds to the row 204b in the data store 116, an entry 302b that corresponds to the row 204c, an entry 304c that corresponds to the row 204a, and an entry 304d that corresponds to the row 204d.

Turning to the entries 302 more specifically, the entry 302a contains concatenated versions of the first and last names contained in the row 204b (i.e., "Bill" and "Smith"). However, the order in which the entries 302 store and concatenate the first and last names may be specified by an indexing priority in effect for the data stores 116 and index tables 118. For example, the indexing priority may identify an order or hierarchy applicable to the columns in the data store 116 for indexing purposes. In the examples shown, the column containing the last names or surnames is given primary indexing priority, such that the index tables 118 index firstly on the fields 206b shown in FIG. 2. Continuing these examples, the column containing the first names or given names is given secondary indexing priority, such that the index tables 118 index secondly on the fields 206a shown in FIG. 2.

Extending beyond the examples shown in FIG. 3, indexing priority schemes may include any number of fields or columns, specifying tertiary or N-levels of columns, where N is any integer having a value of at least two. The examples provided herein include primary and secondary levels of indexing priority only to facilitate this description.

Turning to the entries 302, the entry 302a is populated to include the contents of the storage elements 208d and 208c, arranged as shown and concatenated to result in the value "Smithbill". Similarly, the entry 302b includes the value "Smithbob", the entry 302c includes the value "Smithjohn", and the entry 302d includes the entry "Smootbob".

FIG. 3 represents at 304a-304d (collectively, associations 304) the associations between the entries 302 in the index tables 118 and the rows 204 in the data store 116. These associations facilitate retrieving search results in response to incoming queries, as discussed in more detail below.

Figure 4:
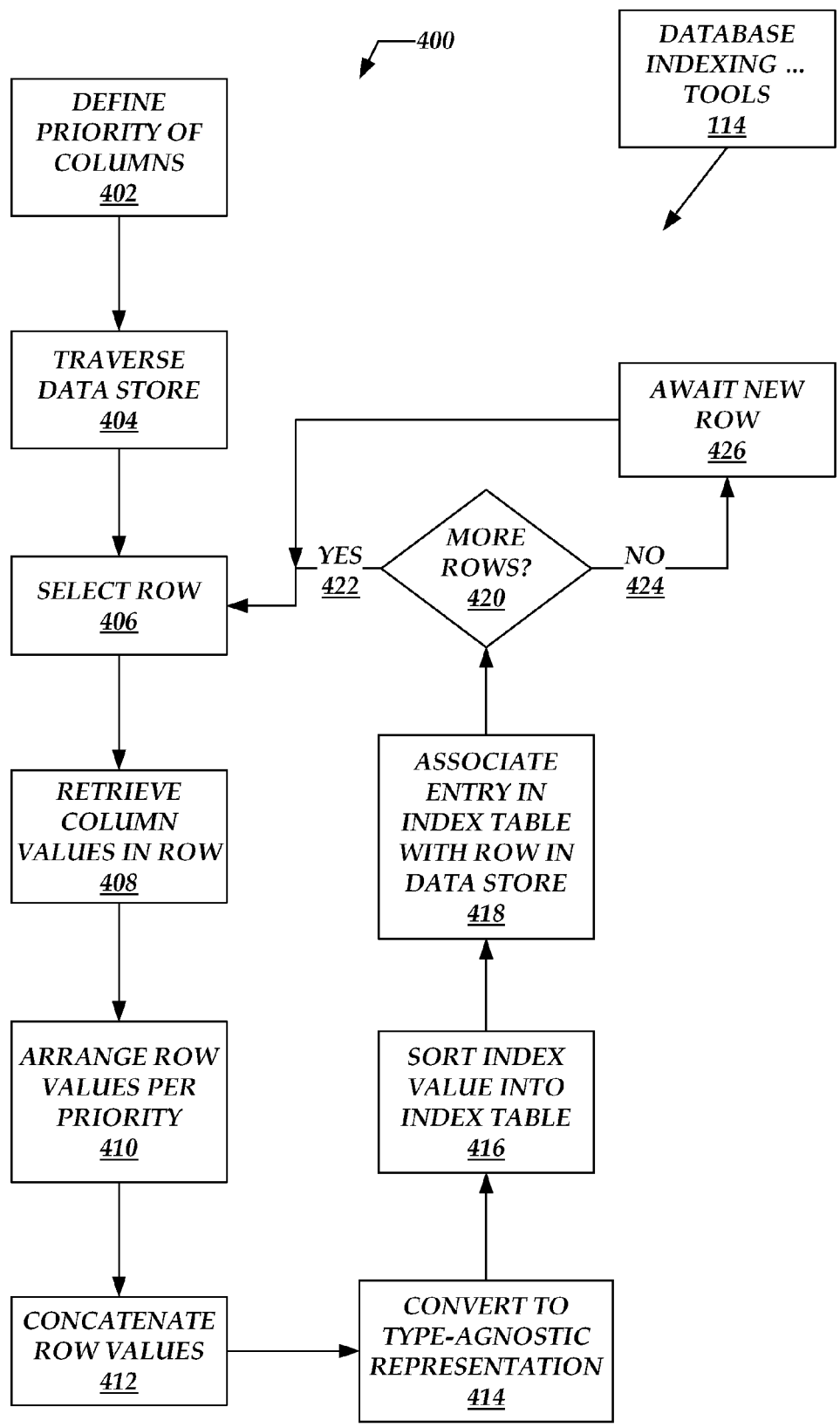
FIG. 4 is a flow diagram illustrating process flows related to indexing the data stores using concatenated terms, in particular facilitating the search techniques described herein.

FIG. 4 illustrates process flows, denoted generally at 400, related to indexing the data stores using concatenated terms, in particular facilitating the search techniques described herein. Although FIG. 4 is described in connection with the database indexing and search tools 114, implementations of this description may perform at least parts of the process flows 400 on other components without departing from the scope and spirit of this description.

Block 402 represents defining an indexing priority for a set of columns in a given data store. Block 402 may include specifying an indexing priority that includes two or more of these columns. However, this indexing priority may or may not include all of the columns contained in a given data store. The indexing priority may specify a primary indexing column, a secondary indexing column, a tertiary indexing column, and so on.

Block 404 represents traversing the data store 116 to index the contents thereof. More specifically, block 404 may include building entries in the index tables 118 that correspond to rows within the data store 116.

Block 406 represents selecting a given row within the data store 116 for indexing. For example, block 406 may include selecting the row 204a shown in FIG. 2 or 3 for indexing.

Block 408 represents retrieving the values of the columns within the row selected in block 406. For example, block 408 may include extracting the row values "John" and "Smith" from the row 204a.

Block 410 represents arranging or ordering the row values according to the indexing priority in effect for the data store 116 as implemented by the index tables 118. In the example shown, the indexing priority specifies that the last name or surname is the primary index, and that the first name or given name is the secondary index. Accordingly, block 410 may include arranging the row values "John" and "Smith" as "Smith" and "John".

Block 412 represents concatenating the row values as arranged in block 410. In the current example, block 412 may include concatenating the row values "Smith" and "John" as "Smithjohn", as shown in FIG. 3 at 302c. These concatenated values are referred to herein as index values, suitable for insertion into the entries 302 of the index tables 118.

Block 414 represents converting the concatenated row values from block 412 into a uniform representation that is agonistic of the type of data that was contained in the data store 116 (e.g., in the storage elements 208). As appreciated by those skilled in the art, different types of data may be represented differently internally within computing systems. For example, unsigned integers may have one internal representation, signed integers may have another internal representation, floating-point number may have their own internal representation, strings may have yet another internal representation, and so on.

To retrieve these data types from their internal representations typically involves having some awareness or knowledge of these underlying data types. However, the entries 302 within the index tables 118 represent all data types uniformly, regardless of the data type used to represent the corresponding information in the storage elements 208 in the data store 116. Accordingly, the entries 302 within the index tables 118 are agnostic or unaware of what types of data they are indexing within the rows 204 of the data store 116.

When processing a given query, as described further below, the entries 302 may be bitwise-compared to the values contained in the given query. This bitwise comparison does not account for the data types of the values contained in the given query, or the data types contained within the data store 116.

Block 416 represents sorting the concatenated and/or converted index values from block 412 or block 414 into the index tables 118. In the current example, block 416 may include inserting the index value "Smithjohn" into the entry 302c shown in FIG. 3, and sorting this new entry relative to any other entries already in the index tables 118.

Block 418 represents associating the new entry 302 in the index table 118 with its corresponding row 204 in the data store 116. For example, block 418 may include building the associations 304 shown in FIG. 3. In the specific example of inserting the index value "Smithjohn" into the index table 118, block 418 may include adding the association 304c, linking the entry 302c with the row 204a.

Decision block 420 represents evaluating whether any more rows 204 remain unindexed in the data store 116. If more rows 204 remain unindexed at a given time, the process flows 400 may take Yes branch 422 to return to block 406, and repeat blocks 406-420 for a next row 204 in the data store 116.

From block 420, if no more rows 204 remain unindexed, the process flows 400 may take No branch 424 to block 426, which represents awaiting arrival of a new row into the data store 116. The process flows 400 may remain in block 426 until a new row is added to the data store 116. Once a new row arrives, the process flows 400 may proceed to block 406 to index this new row.

As appreciated from the foregoing description, the process flows 400 may be performed on an ongoing basis to index rows existing within a given data store 116. In addition, the process flows 400 may index new rows as they are loaded into the data store 116.

Figure 5:
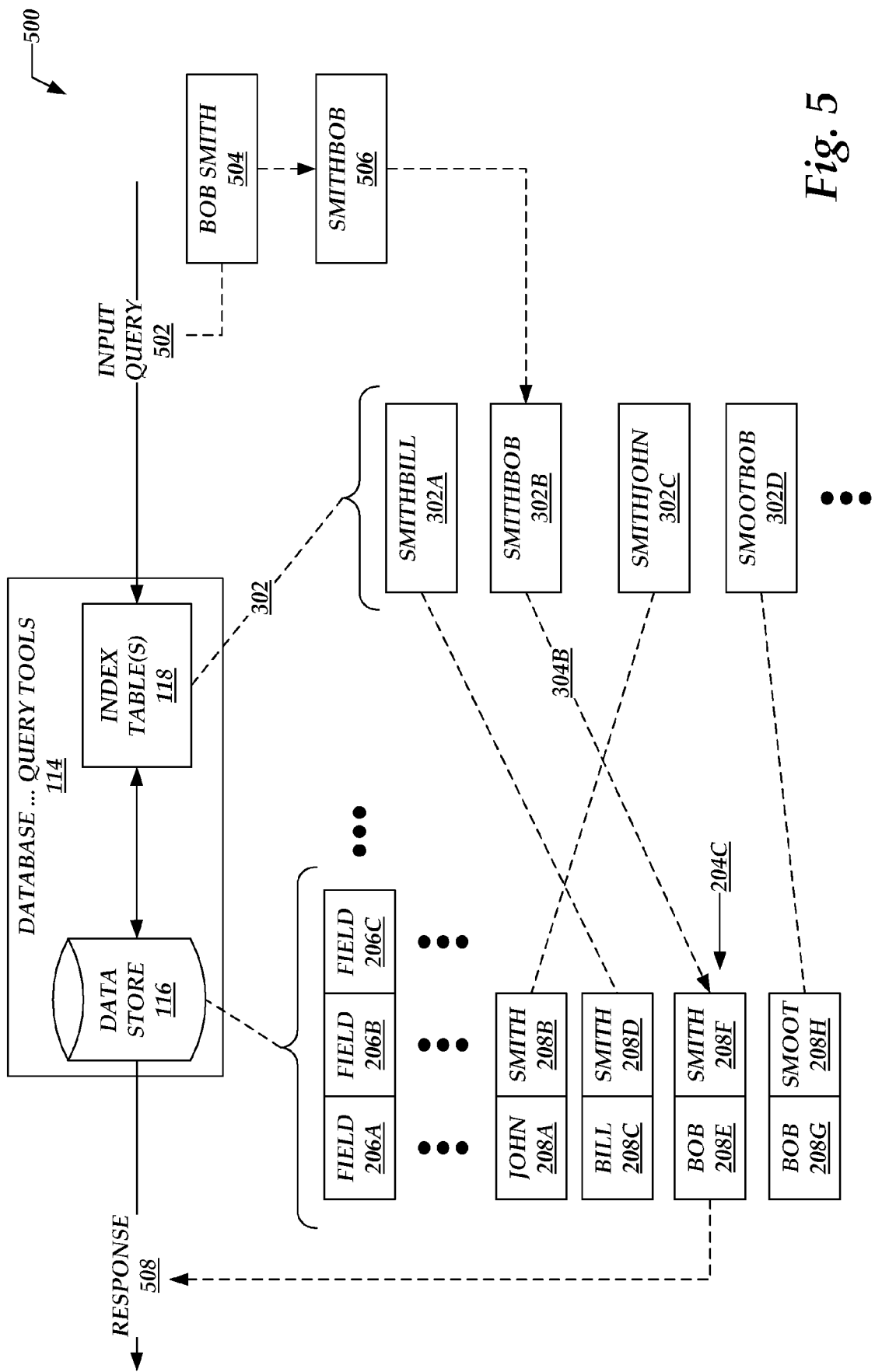
FIG. 5 is a combined block and flow diagram illustrating components and data flows related to processing input queries using the index tables shown in FIGS. 3 and 4.

FIG. 5 illustrates components and data flows, denoted generally at 500, related to processing input queries using the index tables shown in FIGS. 3 and 4. As shown in FIG. 5, the database indexing and query tools 114 may receive an input query 502 for processing. This given query 502 may reference one or more query terms, denoted collectively at 504. Query terms that reference a primary indexed field and at least one additional indexed field may utilize composite indexes as described herein. For example, consider a composite index created for four columns A, B, C, and D. Queries with terms referring only to the column A may be satisfied without using the composite index, returning all rows that met the term for column A. However, other queries may include terms for the columns A, B, and D. These latter queries may use the composite index for columns A and B, and may use other techniques for testing column D (e.g., analyzing the actual data column). Other implementations may reject this latter query as incomplete, since it provides a value for the column D but not the column C.

In the example shown in FIG. 5, the query may seek all records from the data store 116 relating to a person named "Bob Smith" (i.e., last name "Smith", first name "Bob"). Using the process flows detailed further in FIG. 6, the database indexing and query tools 114 may convert the input query terms "Bob" and "Smith" into an index term "Smithbob", as shown at 506. The database indexing and query tools 114 may then search the index tables 118 for any entries responsive to this index term "Smithbob". In the example shown, the entry 302b is responsive to the index term "Smithbob". Accordingly, the database indexing and query tools 114 may follow the entry 302b along association link 304b to row 204c in the data store 116. In turn, the database indexing and query tools 114 may extract at least part of the row 204c as a response 508 to the query 502.

Figure 6:
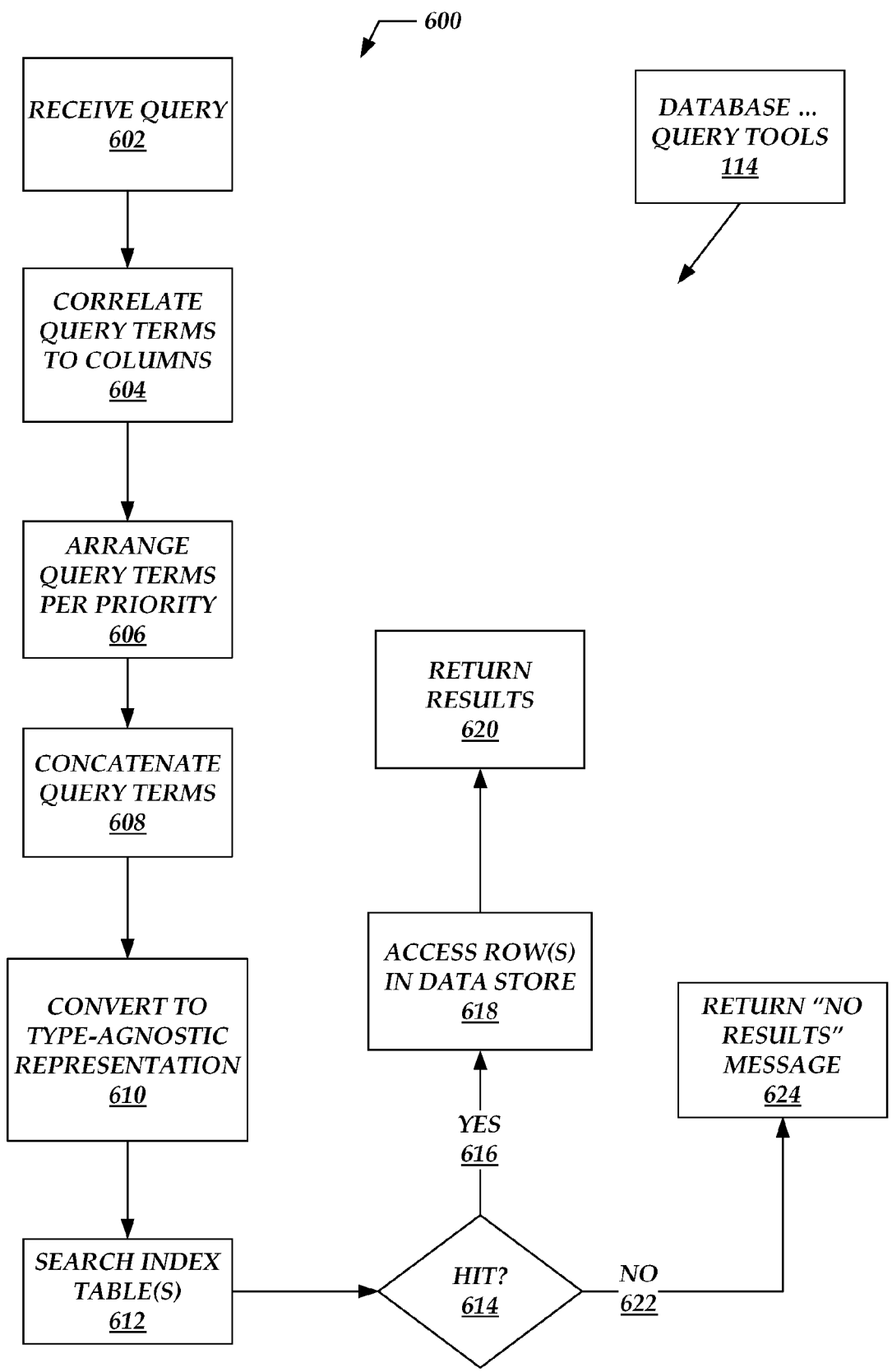
FIG. 6 is a flow diagram illustrating process flows related to searching the index tables in connection with processing input queries.

FIG. 6 illustrates process flows, denoted generally at 600, related to searching the index tables in connection with processing input queries. Although FIG. 6 is described in connection with the database indexing and search tools 114, implementations of this description may perform at least parts of the process flows 600 on other components without departing from the scope and spirit of this description.

Block 602 represents receiving a given input query for processing. FIG. 5 provides examples of input queries at 502, and responses thereto at 508. The input query received in block 602 may include two or more terms or properties of interest, referred to collectively as query terms (e.g., 504 in FIG. 5).

Block 604 represents correlating the query terms received in block 602 with the fields 206 defined by the various columns 202 of the data store 116. For example, block 604 may include determining that the query term "Bob" is a first name or given name that is represented in the fields 206a, and that the query term "Smith" is a last name or surname that is represented in the fields 206b.

Block 606 represents arranging the query terms according to the same indexing priority used to construct the index tables 118, as discussed above. In the ongoing example, the indexing priority specifies the surname field as the primary index, and specifies the given name field as the secondary index. Accordingly, block 606 in this example may include arranging the input query terms "Bob" and "Smith" as "Smith" "Bob" according to the indexing priority.

Block 608 represents concatenating the query terms that were arranged per block 606. Thus, block 608 may concatenate the query terms "Smith" "Bob" into the concatenated query term "Smithbob".

Block 610 represents converting the query term resulting from block 608 into a uniform or type-agnostic binary representation, as described above in FIG. 4 with block 414. Recalling previous description, the database indexing and search tools 114 may apply this same conversion when indexing values into the index table 118. In this manner, the process flows 600 may process input queries without regard to the data types involved in the queries.

Block 612 represents searching the index tables 118 for any entries 302 that are responsive to the converted query term resulting from block 610. Because block 610 converted the query term to a uniform or type-agnostic binary representation, block 612 need not concern itself with the type of data sought by the incoming query 502. More specifically, block 612 may perform a bitwise binary comparison, comparing the converted query term to the entries 302 in the index tables 118. However, these entries 302 in the index tables 118 were populated using a similar general approach, as described above in FIG. 4. Namely, the database indexing and search tools 114 ordered or arranged the terms according to the indexing priority, concatenated the terms, and then converted the terms to the uniform binary representation. Therefore, the comparisons performed in block 612 may proceed by comparing values that were computed using similar techniques.

Block 614 represents evaluating whether any of the entries 302 in the index table are responsive to the query term (e.g., 506). For example, continuing the ongoing example, block 614 may include comparing the query term "Smithbob" to the example entries 302 shown in FIG. 5. In this example, the entry 302b is responsive to "Smithbob", indicating through association 304b that the row 204c is responsive to the query.

For some input queries, blocks 612 and 614 may include operations that evaluate whether compared properties are equal to one another. For other input queries, blocks 612 and 614 may include inequality operations that evaluate how properties having unequal values relate to one another (e.g., $<, \leq, >, \geq$, and the like). Still other queries may involve both equality and inequality operations.

A first example includes the plain-language query:
 column A IS EQUAL TO value one AND column B IS EQUAL TO value two In this example, the input query specifies two values (e.g., "Bob" and "Smith"), and asks for all records that contain both values. The query value for searching against the index table is created by concatenating the value specified for the primary column (e.g., "Smith") with the value specified for the secondary column (e.g., "Bob"). This query value is then checked for equality against the index values as stored in the entries of the index table.

A second example includes the plain-language query:

---
column A IS IN the set one of values {..} AND
column B IS EQUAL TO value two
column B IS IN the set three of values {..} AND
column A IS EQUAL TO value four
---

This second example finds values using an "In" comparison for one of the query values, and uses an equality comparison for the other query value. In a more specific example, this query may ask for all rows where a country field equals or is "In" the United States, AND where a sub-region field (e.g., states) is within a specified set of sub-regions {e.g., Washington, Idaho, Oregon, etc.}. An illustrative example may be:

---
column state IS IN the set of values {ID, OR, WA} AND
column category IS
    EQUAL TO the value 1
---

This query may be processed by creating n values, where n is the number of conditions in the In clause. The query values are the concatenations of an In value with the Eq value. A comparison performed in the query may include:

---
                Index.Value IN {n concatenated values}, or
alternatively
                Index.Value = V1 OR Index.Value = V2 ...
---

A third example includes the query language:

<And><Eq/><Ineq/></And>

The third example evaluates an equality expression on the primary index field, and evaluates an inequality expression on the secondary field. More generally, this example may be viewed as an equality expression on some number of fields in the order indicated by the indexing priority. In this example, "Eq" represents the query value in the primary index field, and "Ineq" represents the query value in the secondary field. This query may be processed by creating two values: a first value (V1) formed by concatenating the Eq value and the Ineq value, and a second value (V2) formed by concatenating the Eq value and a boundary value. The boundary value is a minimum or maximum value, depending on the Ineq operator as defined below. A comparison performed in the query may include:

| | Index.Value [Ineq] V1 AND Index.Value [Ineq'] V2. |
|---|---|
| Where: | Ineq-complementary is >= if Ineq is < or <= |
| | Ineq is <= if Ineq is > or >= |

A fourth example includes the query language:

<And><Eq/><And><Ineq1/><Ineq2/></And></And>

In this example, this query asks for all records falling between two query values, with the query values defined by two fields (e.g., "Bill" "Smith", and "Bob" "Smith", where the query requests all records falling between "Bill Smith" and "Bob Smith").

The query may be processed by construct two composite values, and applying inequalities (e.g., greater than "Bill Smith" and less than "Bob Smith"). More generally, Eq represents the primary index field, and Ineq1 and Ineq2 represent the secondary index field. Considering cases where Ineq1 and Ineq2 complement each other: $\{>, >=\}$ and $\{<, <=\}$, two values may be created for the query. The first value (V1) is the concatenation of the Eq value and Ineq1 value, and the second value (V2) is the concatenation of the Eq value and the Ineq2 value. A comparison performed in the query may include:

Index.Value [Ineq1] V1 AND Index.Value [Ineq2] V2.

Implementations of this description are not limited to the foregoing examples. More specifically, the composite index may support further examples of logic, in addition to the examples given above. Consider the example plain-language query statement:

"column A IN set one { . . . } AND column B IN set two { . . . }".

The expression of this query statement may be the cross-product of the two sets, combining respective values in set one with respective values in set two, thereby resulting in (size-of-set-onexsize-of-set-two) values to be sought in the index.

From block 614, if one or more of the entries 302 in the index table are responsive to the query term, then the process flows 600 may take Yes branch 616 to block 618. Block 618 represents accessing the row or rows in the data store 116 that are associated with any responsive entries in the index table 118. In the "Smithbob" example, block 618 may include traversing the association 304b to the row 204c.

Block 620 represents returning any responsive results as obtained from the data store 116. In the "Smithbob" example, block 620 may include sending at least part of the data stored in at least the row 204c in the data store 116.

From decision block 614, if no entries 302 in the index table are responsive to the converted query term, the process flows 600 may take No branch 622 to block 624. Block 624 represents returning a message or response indicating that no rows in the data store 116 were responsive to the input query.

The foregoing description provides technologies for indexing and querying data stores using concatenated terms. Although the this description incorporates language specific to computer structural features, methodological acts, and computer readable media, the scope of the appended claims is not necessarily limited to the specific features, acts, or media described herein. Rather, this description provides illustrative, rather than limiting, implementations. Moreover, these implementations may modify and change various aspects of this description without departing from the true spirit and scope of this description, which is set forth in the following claims.

We claim:

1. An apparatus comprising at least one computer-readable storage medium having stored thereon computer-executable instructions that, when loaded into a processor and executed, cause the processor to:
    traverse a data store that includes a plurality of records, wherein the records are associated with at least two fields that are populated with respective values;
    select at least one of the records for indexing;
    retrieve the field values from the selected record;
    define an indexing priority specifying how to rank the field values;
    arrange the field values according to the indexing priority;
    concatenate the field values as arranged per the indexing priority;
    sort the concatenated field values into an entry within an index table;
    associate the entry in the index table with the selected record from the data store;
    receive an input query that includes at least two query values that respectively reference at least the two field values;
    correlate the query values to fields in the data store;
    arrange the query values according to the indexing priority;
    concatenate the query values as arranged in the indexing priority; and
    search the index table for any entries that are responsive to the concatenated query values.

2. The apparatus of claim 1, further comprising instructions to convert the concatenated field values into a binary representation that is uniform across a plurality of different data types.

3. The apparatus of claim 2, wherein the instructions to convert include instructions to convert a field value that represents a floating point number into the uniform binary representation.

4. The apparatus of claim 2, wherein the instructions to convert include instructions to convert a field value that represents a signed integer into the uniform binary representation.

5. The apparatus of claim 1, further comprising instructions to select at least a further record in the data store for indexing, and repeating the retrieving, defining, arranging, concatenating, sorting, and associating for the further record.

6. The apparatus of claim 5, wherein the instructions to select at least a further record includes selecting a record added to the data store.

7. The apparatus of claim 1, further comprising instructions to convert the concatenated query values into a binary representation that is uniform across a plurality of different data types.

8. An apparatus comprising at least one computer-readable storage medium having stored thereon computer-executable instructions that, when loaded into a processor and executed, cause the processor to:
    traverse a data store that includes a plurality of columns and a plurality of rows, wherein the rows are associated with records having at least two fields, wherein the columns are associated with respective values that populate the fields;
    select at least one of the rows for indexing;

retrieve the field values from the columns within the selected row;
define an indexing priority specifying how to rank the field values;
arrange the field values according to the indexing priority;
concatenate the field values as arranged per the indexing priority;
sort the concatenated field values into an entry within an index table;
convert the concatenated field values into a binary representation that is uniform across a plurality of different data types;
associate the entry in the index table with the selected row from the data store;
receive at least one input query that includes at least two query terms;
correlate the query terms respectively with columns contained within the data store;
arrange the query terms according to an indexing priority in which the fields are ranked within an indexing table associated with the data store;
concatenate the query terms as arranged according to the indexing priority;
convert the concatenated query terms into the uniform binary representation; and
search the index table for any entries therein that are responsive to the concatenated query terms.

9. The apparatus of claim 8, wherein:
the instructions to convert the concatenated field values into the uniform binary representation comprise instructions to convert the concatenated field values that each represent an unsigned integer, a signed integer, a floating-point number, or a string into the uniform binary representation; and
the instructions to convert the concatenated query terms into the uniform binary representation comprise instructions to convert the concatenated query terms that each represent an unsigned integer, a signed integer, a floating-point number, or a string into the uniform binary representation.

10. The apparatus of claim 8, further comprising instructions to determine that no entries in the index table are responsive to the query terms, and to provide a response to the input query so indicating.

11. The apparatus of claim 8, further comprising instructions to determine that one or more entries in the index table are responsive to the query terms, to access one or more rows of the data store that are associated with the entries, and to return data stored in the accessed rows of the data store.

* * * * *